US012566665B1

(12) United States Patent
Walters et al.

(10) Patent No.: US 12,566,665 B1
(45) Date of Patent: Mar. 3, 2026

(54) MODULAR PARITY CACHING FOR DATA STORAGE AND RECOVERY

(71) Applicant: Disney Enterprises, Inc., Burbank, CA (US)

(72) Inventors: Matthew Walters, Toluca Lake, CA (US); Jacqueline Hutchinson, Temecula, CA (US); Juerg W. Grieder, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 18/818,482

(22) Filed: Aug. 28, 2024

(51) Int. Cl.
| | |
|---|---|
| G06F 11/00 | (2006.01) |
| G06F 11/10 | (2006.01) |
| G06F 3/06 | (2006.01) |

(52) U.S. Cl.
CPC ........ G06F 11/1076 (2013.01); G06F 3/0689 (2013.01); G06F 2211/1009 (2013.01)

(58) Field of Classification Search
CPC .............. G06F 3/0689; G06F 11/1076; G06F 2201/1009
See application file for complete search history.

(56) References Cited

U.S. PATENT DOCUMENTS

| | | | | |
|---|---|---|---|---|
| 5,544,356 | A * | 8/1996 | Robinson ............. | G11C 16/349 365/185.11 |
| 6,839,827 | B1 * | 1/2005 | Beardsley ............. | G06F 3/0689 711/206 |
| 6,935,516 | B2 | 8/2005 | Chiang | |
| 7,136,977 | B2 | 11/2006 | Obayashi et al. | |
| 8,615,681 | B2 | 12/2013 | Horn | |
| 9,454,333 | B2 | 9/2016 | Blaum et al. | |
| 9,792,178 | B2 | 10/2017 | Trachy et al. | |
| 11,474,753 | B2 | 10/2022 | Zakharkin et al. | |
| 11,614,883 | B2 | 3/2023 | Vastrad et al. | |
| 2002/0144048 | A1 * | 10/2002 | Bolt ...................... | G06F 3/0658 |
| 2014/0250269 | A1 | 9/2014 | Shanbhag et al. | |
| 2017/0308437 | A1 * | 10/2017 | Usvyatsky .......... | G06F 11/1076 |

FOREIGN PATENT DOCUMENTS

| | | |
|---|---|---|
| WO | 2008/073716 A1 | 6/2008 |

OTHER PUBLICATIONS

Theodore Johnson, Sunil Prabhakar "Tape Group Parity Protection" 16th IEEE Symposium on Mass Storage Systems Mar. 15-18, 1999 8 Pgs.

* cited by examiner

*Primary Examiner* — Craig S Goldschmidt
(74) *Attorney, Agent, or Firm* — Farjami & Farjami LLP

(57) ABSTRACT

A system for performing modular parity caching includes a computing platform having a hardware processor and a system memory storing software code. The hardware processor executes the software code to receive a dataset, identify a first storage medium for storing the dataset, determine a target data size for a data subset, and partition the dataset into a plurality of data subsets each having the target data size. The hardware processor further executes the software code to compute, using the data subsets, a parity bit for each data field occupying the same position in each of the data subsets to provide a plurality of parity bits each corresponding respectively to one data field occupying the same position in each of the data subsets, store each of the data subsets in the first storage medium, and store the parity bits as a parity cache in a second storage medium.

20 Claims, 4 Drawing Sheets

Fig. 3

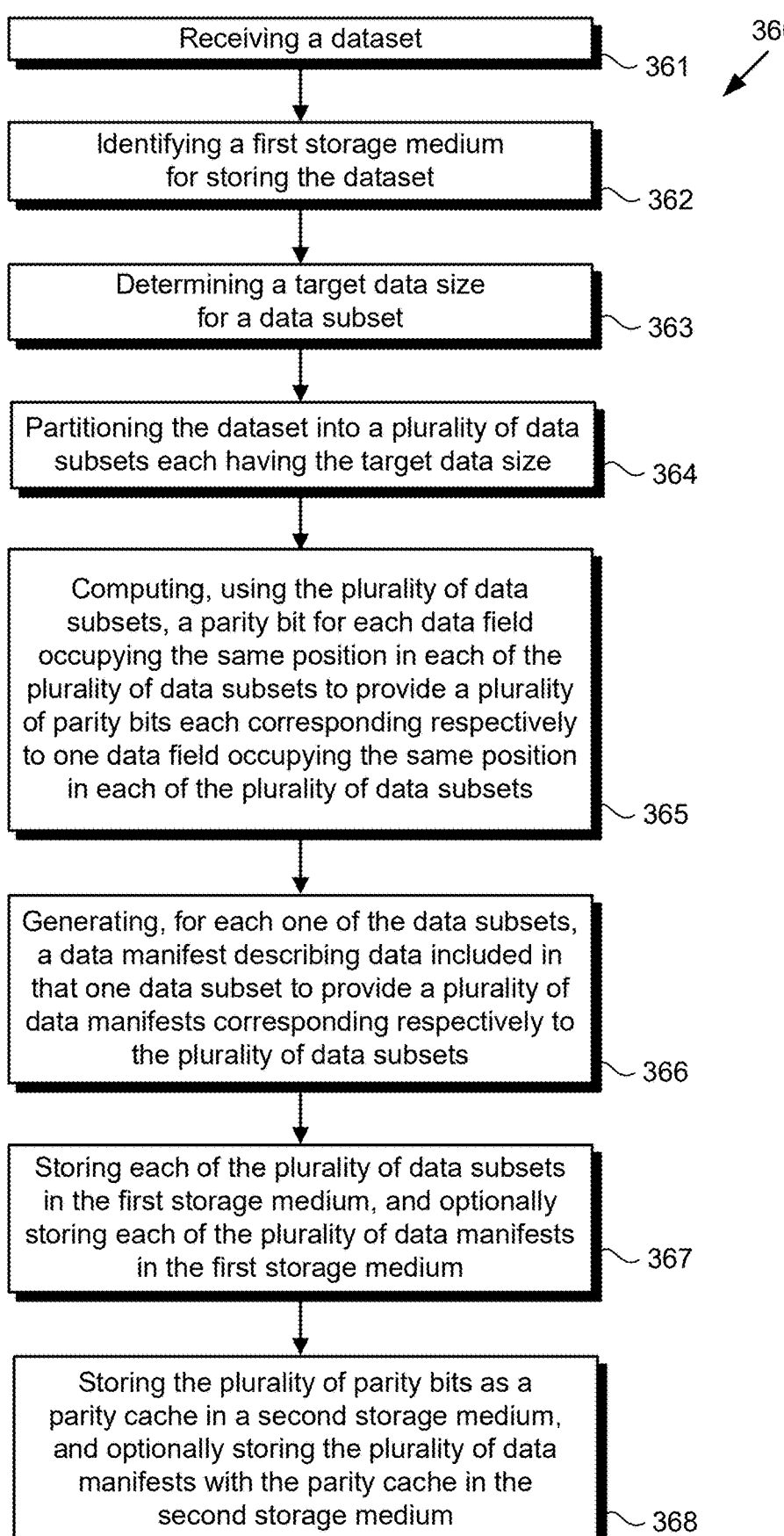

360

Receiving a dataset ~ 361

Identifying a first storage medium for storing the dataset ~ 362

Determining a target data size for a data subset ~ 363

Partitioning the dataset into a plurality of data subsets each having the target data size ~ 364

Computing, using the plurality of data subsets, a parity bit for each data field occupying the same position in each of the plurality of data subsets to provide a plurality of parity bits each corresponding respectively to one data field occupying the same position in each of the plurality of data subsets ~ 365

Generating, for each one of the data subsets, a data manifest describing data included in that one data subset to provide a plurality of data manifests corresponding respectively to the plurality of data subsets ~ 366

Storing each of the plurality of data subsets in the first storage medium, and optionally storing each of the plurality of data manifests in the first storage medium ~ 367

Storing the plurality of parity bits as a parity cache in a second storage medium, and optionally storing the plurality of data manifests with the parity cache in the second storage medium ~ 368

MODULAR PARITY CACHING FOR DATA STORAGE AND RECOVERY

BACKGROUND

Magnetic tape-based media provides an inexpensive solution for the backup and archiving of digital data. Nevertheless, one drawback associated with magnetic tape is that there is no easy way to provide data redundancy. For example, at present the most common solution to providing redundancy is to create two magnetic tape copies of the same data, so that in the event one copy is damaged the data can be restored from the second copy. However this conventional solution requires additional hardware and consumes more time to create additional copies.

When using digital storage media, rather than magnetic tape, one common solution for providing data redundancy uses Redundant Arrays of Independent Disks (RAID) technologies. By using such a redundant array of independent disks, data is written across all the disks at the same time along with parity information. In the event of a loss of data on one of the disk drives, the missing data can be recovered using the data on the remaining disk drives along with the parity information.

Although there are magnetic tape-based systems that attempt to mimic conventional RAID solutions, they work by employing a plurality of tape drives and data is written across all the tapes at the same time. As a result, this type of solution is undesirably costly and requires investments in both hardware and custom software.

BRIEF DESCRIPTION OF THE DRAWINGS

FIG. 3 shows a flowchart presenting a method for performing modular parity caching, according to one implementation.

DETAILED DESCRIPTION

Figure 1:
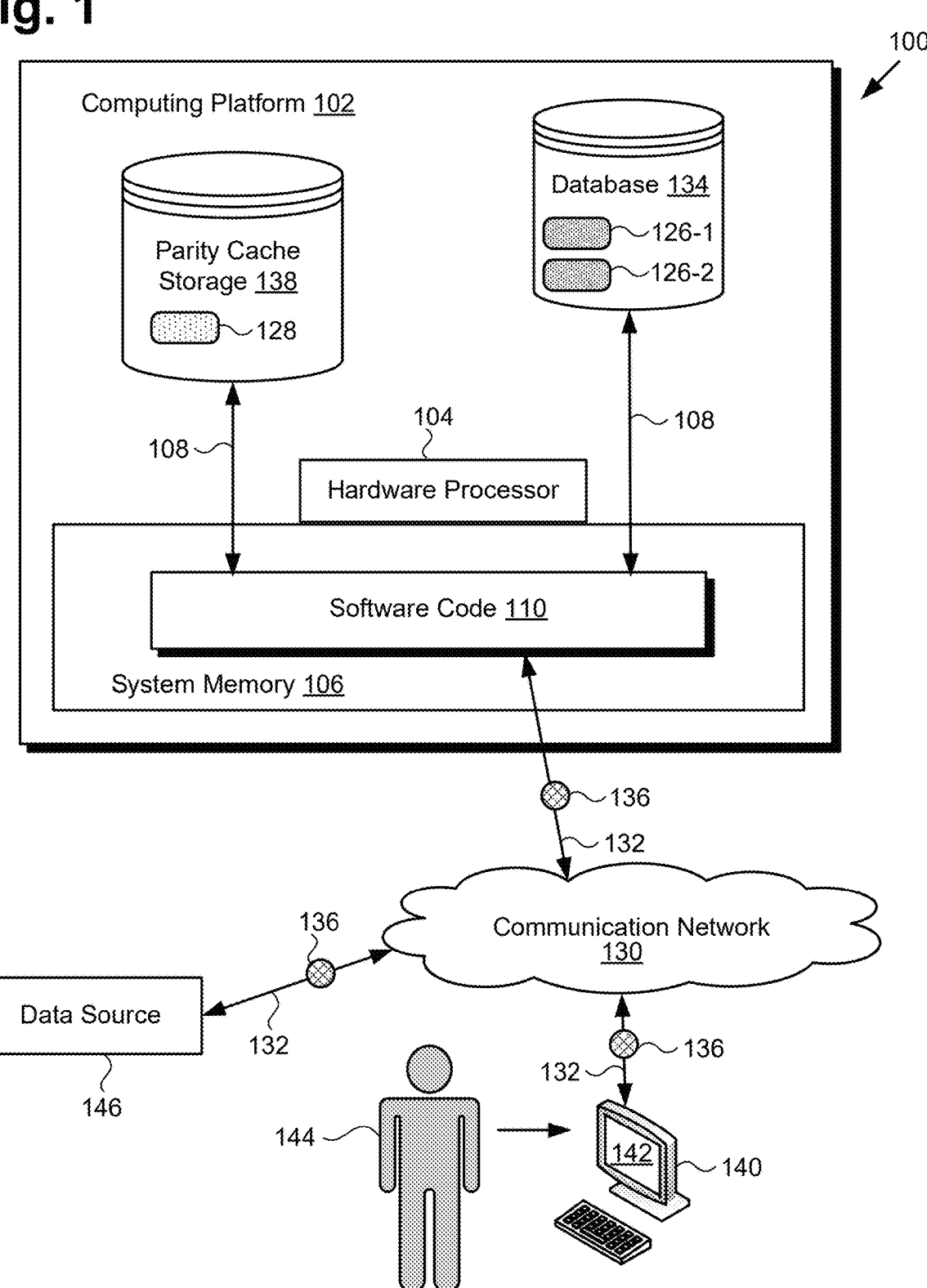
FIG. 1 shows a diagram of an exemplary system for performing modular parity caching, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing modular parity caching for data storage and recovery that address and overcome the deficiencies in the conventional art. As noted above, although magnetic tape-based media provides an inexpensive solution for the backup and archiving of digital data, there is presently no easy way to provide data redundancy. For example, and as further noted above, at present the most common solution to providing redundancy is to create two magnetic tape copies of the same data, so that in the event one copy is damaged the data can be restored from the second copy.

In the realm of digital storage media, by contrast to magnetic tape and other linear storage media, one common solution for providing data redundancy uses Redundant Arrays of Independent Disks (RAID) technologies. By using such a redundant array of independent disks, data is written across all the disks at the same time along with parity information. In the event of a loss of data on one of the disk drives, the missing data can be recovered using the data on the remaining disk drives along with the parity information.

As also noted above, although there are magnetic tape-based systems that attempt to mimic conventional RAID solutions, they work by employing a plurality of tape drives and data is written across all the tapes at the same time. As a result, this type of solution is undesirably costly and requires investments in both hardware and custom software.

Because magnetic tape is a linear storage medium, the creation of parity information that can be used to recover data in the event of loss remains a challenge in the art. The modular parity caching solution disclosed by the present application addresses this challenge by partitioning a dataset into a plurality of data subsets, where each data subset represents a specific amount of data that will be written to a single magnetic tape or to a single instantiation of another storage medium. The present solution advances the state-of-the-art by introducing a "virtual data stripe" that can be created across all data subsets and enables the computation of a parity bit that can be stored in a parity cache. Once the parity data has been computed for all the data subsets, the parity cache can be written to magnetic tape or another storage medium separate from the storage media to which the data subsets are written.

In addition to the parity cache, which represents the parity information across the virtual data stripe, a dataset manifest may also be generated for each data subset. The data manifest includes detailed information about the files and data that make up a given data subset. The data manifests can be stored along with the parity cache data and can be used to quickly identify all the files needed to rebuild the parity cache. Having a data manifest also provides for a simple method of restoring individual files or partial data subsets. In the event a data subset is damaged or overwritten, the missing data subset can be recovered using the remaining undamaged data subsets and the parity data. It is noted that the present modular parity caching solution can advantageously be implemented as automated systems and methods.

As used in the present application, the terms "automation," "automated" and "automating" refer to systems and processes that do not require the participation of a human system operator. Although in some implementations, a human system operator may review the performance of the systems and methods disclosed herein, that human involvement is optional. Thus, the methods described in the present application may be performed under the control of hardware processing components of the disclosed automated systems.

FIG. 1 shows a diagram of exemplary system 100 for performing modular parity caching, according to one implementation. System 100 includes computing platform 102 having hardware processor 104 and system memory 106 implemented as a computer-readable non-transitory storage medium. According to the present exemplary implementation, system memory 106 stores software code 110, database 134 and parity cache storage 138.

As shown in FIG. 1, system 100 is implemented within a use environment including one or more of user system 140 having display 142, and data source 146, either of which may provide dataset 136 to system 100 via communication network 130, which may take the form of a packet-switched network, such as the Internet. Also shown in FIG. 1 are a plurality of instantiations of a first storage medium depicted as first storage media 126-1 and 126-2, which are stored in database 134 and have stored therein respective data subsets of dataset 136, second storage medium 128 stored in parity cache storage 138 and having stored therein at least a parity cache for dataset 136, user 144 of user system 140, communication links 108 interactively connecting software code 110 with database 134 and parity cache storage 138, and network communication links 132 of communication network 130 interactively connecting system 100 with one or more of user system 140 and data source 146.

With respect to the representation of system 100 shown in FIG. 1, it is noted that system memory 106 may take the form of any computer-readable non-transitory storage medium. The expression "computer-readable non-transitory storage medium," as defined in the present application, refers to any medium, excluding a carrier wave or other transitory signal that provides instructions to hardware processor 104 of computing platform 102 or to a hardware processor of user system 140. Thus, a computer-readable non-transitory storage medium may correspond to various types of media, such as volatile media and non-volatile media. Volatile media may include dynamic memory, such as dynamic random access memory (dynamic RAM), while non-volatile memory may include optical, magnetic, or electrostatic storage devices. Common forms of computer-readable non-transitory storage media include: optical discs such as DVDs, RAM, programmable read-only memory (PROM), erasable PROM (EPROM), and FLASH memory.

Moreover, in some implementations, system 100 may utilize a decentralized secure digital ledger in addition to, or in place of, system memory 106. Examples of such decentralized secure digital ledgers may include a blockchain, hashgraph, directed acyclic graph (DAG), and Holochain® ledger. In use cases in which the decentralized secure digital ledger is a blockchain ledger, it may be advantageous or desirable for the decentralized secure digital ledger to utilize a consensus mechanism having a proof-of-stake (POS) protocol, rather than the more energy intensive proof-of-work (PoW) protocol.

Although FIG. 1 depicts software code 110 as being stored in its entirety in system memory 106, that representation is also provided merely as an aid to conceptual clarity. More generally, system 100 may include one or more computing platforms 102, such as computer servers, which may be co-located, or may form an interactively linked but distributed system, such as a cloud-based system. As a result, hardware processor 104 and system memory 106 may correspond to distributed processor and memory resources within system 100. Consequently, in some implementations, some or all of the various modules of software code 110, which are shown and described in greater detail below by reference to FIG. 4, may be stored remotely from one another on the distributed memory resources of system 100.

Hardware processor 104 may include a plurality of processing units, such as one or more central processing units, one or more graphics processing units and one or more tensor processing units, one or more field-programmable gate arrays (FPGAs), custom hardware for machine-learning training or inferencing, and an application programming interface (API) server. By way of definition, as used in the present application, the terms "central processing unit" (CPU), "graphics processing unit" (GPU), and "tensor processing unit" (TPU) have their customary meaning. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence processes such as machine learning.

In some implementations, computing platform 102 may correspond to one or more web servers accessible over a packet-switched network such as the Internet. Alternatively, computing platform 102 may correspond to one or more computer servers supporting a wide area network (WAN), a local area network (LAN), or included in another type of private or limited distribution network. In addition, or alternatively, in some implementations system 100 may utilize a local area broadcast method, such as User Datagram Protocol (UDP) or Bluetooth®. For example, in some implementations, system 100 may be implemented in software, or as virtual machines. Moreover, in some implementations, system 100 may be configured to communicate via a high-speed network suitable for high performance computing (HPC). Thus, in some implementations, communication network 130 may be or include a 10 GigE network or an Infiniband network, for example.

Although user system 140 is depicted as a desktop computer in FIG. 1, that representation is merely exemplary. More generally, user system 140 may take the form of any suitable mobile or stationary computing device or system that implements data processing capabilities sufficient to provide a user interface, support connections to communication network 130, and implement the functionality ascribed to user system 140 herein. In various use cases, user system 140 may take the form of a tablet computer, laptop computer, or smartphone, for example, providing display 142. In other implementations, user system 140 may be a peripheral device of system 100 in the form of a "dumb" terminal. In those implementations, user system 140 may be controlled by hardware processor 104 of computing platform 102.

With respect to display 142 of user system 140, display 142 may take the form of a liquid crystal display (LCD), a light-emitting diode (LED) display, an organic light-emitting diode (OLED) display, a quantum dot (QD) display, or any other suitable display screen that performs a physical transformation of signals to light. Furthermore, display 142 may be physically integrated with user system 140 or may be communicatively coupled to but physically separate from user system 140. For example, where user system 140 is implemented as a smartphone, laptop computer, tablet computer, or an AR or VR device, display 142 will typically be integrated with user system 140. By contrast, where user system 140 is implemented as a desktop computer, display 142 may take the form of a monitor separate from user system 140 in the form of a computer tower.

Data source 146 may be a producer or distributor of media content, or a data archive storing a plurality of datasets corresponding to dataset 136. Dataset 136 may be a large dataset including terabytes of digital data. In some implementations, for example, dataset 136 may include digital data corresponding to various types of media content. Examples of such media content may include video games, music videos, animation, movies, or episodic television (TV) content that includes episodes of TV shows that are broadcasted, streamed, or otherwise available for download or purchase on the Internet or via a user application. In addition, or alternatively, in some implementations, such media content may be or include digital representations of persons, fictional characters, locations, objects, and identifiers such as brands and logos, for example, which populate a virtual reality (VR), augmented reality (AR), or mixed reality (MR) environment. That media content may depict virtual worlds that can be experienced by any number of users synchronously and persistently, while providing continuity of data such as personal identity, user history, entitlements, possessions, payments, and the like. Moreover, in some implementations, such media content may be or include digital content that is a hybrid of traditional audio-video and fully immersive VR/AR/MR experiences, such as interactive video.

First storage media 126-1 and 126-2 may take the form of linear storage media, such as respective magnetic tapes for example. However, in various implementations, each of storage media 126-1 and 126-2 may take the form of any computer-readable non-transitory storage medium, as that feature is described above. Similarly, second storage medium 128 may take the form of a linear storage medium, such as a magnetic tape, or may be any other type of computer-readable non-transitory storage medium. It is noted that in some implementations, first storage media 126-1 and 126-2 and second storage medium 128 may be the same type of storage media, such as magnetic tape, for example, in other implementations first storage media 126-1 and 126-2 may be any type of computer-readable non-transitory storage medium and second storage medium 128 may be any other type of computer-readable non-transitory storage medium.

Figure 2:
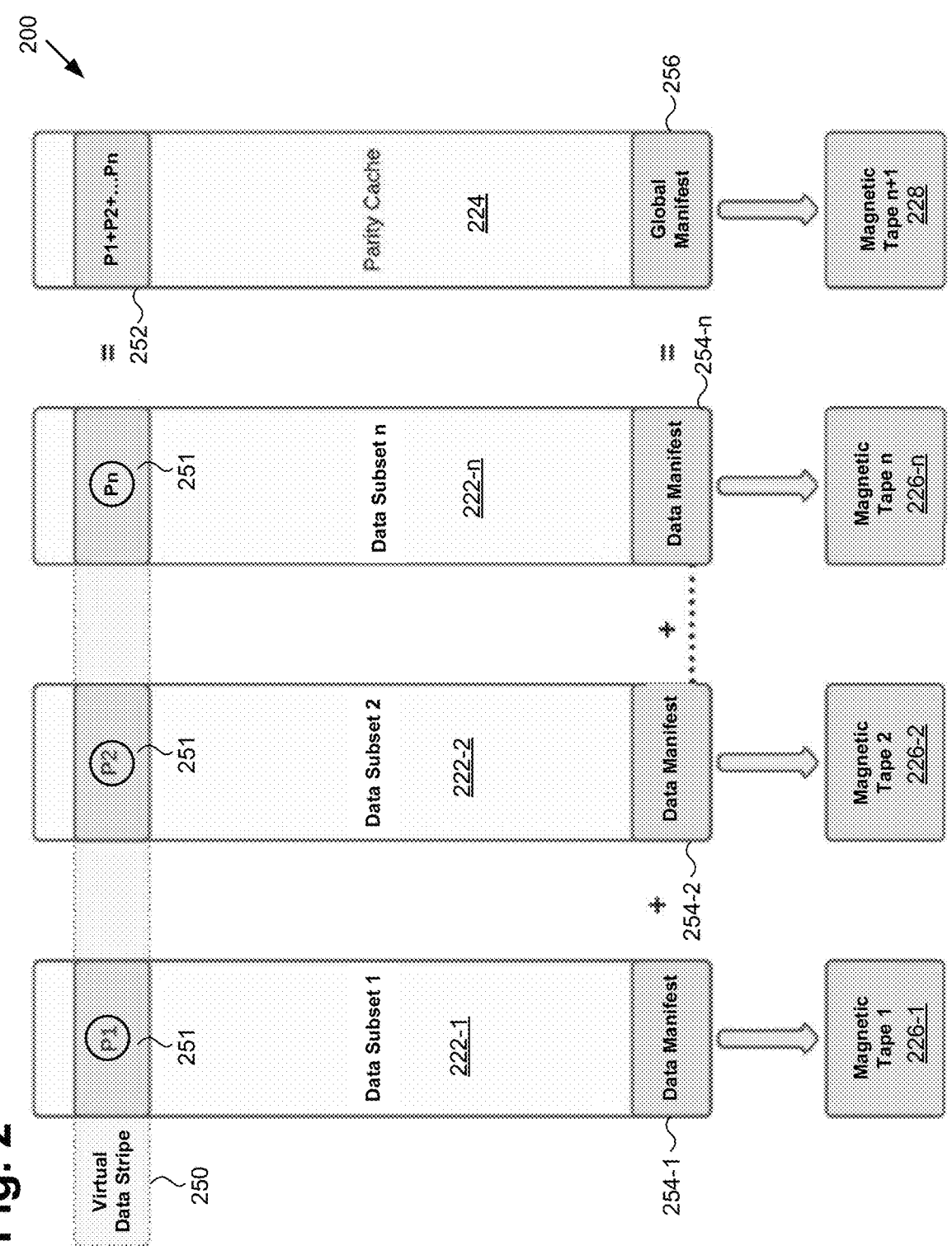
FIG. 2 shows a diagram depicting a process for performing modular parity caching, according to one implementation.

FIG. 2 shows diagram 200 depicting a process for performing modular parity caching, according to one implementation. Referring to FIGS. 1 and 2 in combination, the process depicted by diagram 200 includes partitioning dataset 136 into plurality of data subsets 222-1, 222-2, up to 222-*n*, where "n" may be any integer. In some implementations, each of data subsets 222-1, 222-2, . . . , 222-*n* may include a respective data manifest 254-1, 254-2, . . . , 254-*n* providing detailed information about the files and data that make up the data subset to which the data manifest corresponds. Each of data subsets 222-1, 222-2, . . . , 222-*n* may include a plurality of data fields occupying the same position in each of respective data subsets 222-1, 222-2, . . . , 222-*n*, shown in FIG. 2 by representative data field 251. Virtual data stripe 250 represents the process of using the values stored in each data field 251 occupying the same position in each of respective data subsets 222-1, 222-2, . . . , 222-*n*, i.e., P1, P2, . . . . Pn, to compute parity bit 252 for data field 251.

Parity bit 252 may be computed by applying virtual data stripe 250 as a Boolean "exclusive or" (XOR) function to the values stored in data field 251. For example, each of P1, P2, . . . . Pn may be a single bit, either one (1) or zero (0), with 1 signifying "true" and 0 signifying "false." Virtual data stripe 250 is applied to data field 251 by determining the number of "true" entries present in data field 251, i.e., how many of P1, P2, . . . . Pn are true=1. When P1, P2, . . . . Pn includes an odd number of true=1 values, parity bit 252 is set to 1. When P1, P2, . . . . Pn includes an even number of true=1 values, parity bit 252 is set to 0.

Virtual data stripe 250 may be applied to each data field occupying the same position in each of respective data subsets 222-1, 222-2, . . . , 222-*n* to compute a corresponding plurality of parity bits for data subsets 222-1, 222-2, . . . , 222-*n* in the manner described above. That is to say, a parity bit corresponding to parity bit 252 is computed for each data field occupying the same position in each of respective data subsets 222-1, 222-2, . . . , 222-*n*, e.g., data field 251, to provide a plurality of parity bits, and that plurality of parity bits collectively provides parity cache 224.

Once parity cache 224 has been computed by computing a parity bit for each data field occupying the same position in each of respective data subsets 222-1, 222-2, . . . , 222-*n*, and, in some implementations, respective data manifests 254-1, 254-2, . . . , 254-*n* have been generated for data subsets 222-1, 222-2, . . . , 222-*n*, global manifest 256 including all of data manifests 254-1, 254-2, . . . , 254-*n* may be included with parity cache 224. Data subsets 222-1, 222-2, . . . , 222-*n* including respective data manifests 254-1, 254-2, . . . , 254-*n* may be written to first storage media 226-1, 226-2, . . . , 226-*n*, respectively, shown as magnetic tape in the exemplary implementation depicted in FIG. 2. Parity cache 224 and global manifest 256 may be written to second storage medium 228, also shown as magnetic tape in the exemplary implementation depicted in FIG. 2.

It is noted that first storage media 226-1, 226-2, . . . , 226-*n*, and second storage medium 228 correspond respectively in general to first storage media 126-1 and 126-2, and second storage medium 128, in FIG. 1. Consequently, first storage media 226-1, 226-2, . . . , 226-*n*, and second storage medium 228 may share any of the characteristics attributed to respective first storage media 126-1 and 126-2, and second storage medium 128 by the present disclosure, and vice versa. Thus, although first storage media 226-1, 226-2, . . . , 226-*n*, and second storage medium 228 are depicted as magnetic tape in FIG. 2, in various implementations first storage media 226-1, 226-2, . . . , 226-*n* may take the form of any computer-readable non-transitory storage medium, while second storage medium 228 may take the form of the same computer-readable non-transitory storage medium as first storage media 226-1, 226-2, . . . , 226-*n*, or to any other type of computer-readable non-transitory storage medium.

In summary, the modular parity caching process depicted by diagram 200 in FIG. 2 includes partitioning a dataset into a plurality data subsets 222-1, 222-2, . . . , 222-*n*, where each of data subsets 222-1, 222-2, . . . , 222-*n* represents a specific amount of data that will be written to a single magnetic tape or to a single instantiation of another type of computer-readable non-transitory storage medium. Virtual data stripe 250 can be created across all data subsets 222-1, 222-2, . . . , 222-*n* and enables the computation of parity bit 252 that can be stored in parity cache 224. Once the parity data included in parity cache 224 has been computed for all the data subsets 222-1, 222-2, . . . , 222-*n*, parity cache 224 can be written to magnetic tape or another type of second storage medium 228 separate from first storage media 226-1, 226-2, . . . , 226-*n* to which respective data subsets 222-1, 222-2, . . . , 222-*n* are written.

In addition to parity cache 224, which represents the parity information across virtual data stripe 250, respective dataset manifests 254-1, 254-2, . . . , 254-*n* may also be generated for each data subset. The data manifests include detailed information about the files and data that make up the data subset to which each data manifest corresponds, such as a list of the data files included in the data subset, their respective hashes, and the order of those data files within the data subset, for example. Data manifests 254-1, 254-2, . . . , 254-*n*, collectively, can be stored as global manifest 256 along with parity cache 224 in second storage medium 228 and can be advantageously used to identify all the files needed to rebuild a damaged data subset. Having dataset manifests 254-1, 254-2, . . . , 254-*n* also provides for a simple method of restoring individual files or partial data subsets. In the event one of data subsets 222-1, 222-2, . . . , 222-*n* is damaged or overwritten, the missing data subset can be recovered using the remaining undamaged data subsets and the parity data included in parity cache 224 using standard parity or RAID logic, e.g., 1+2+3=6 . . . 1+x+3=6, x=2.

Figure 4:
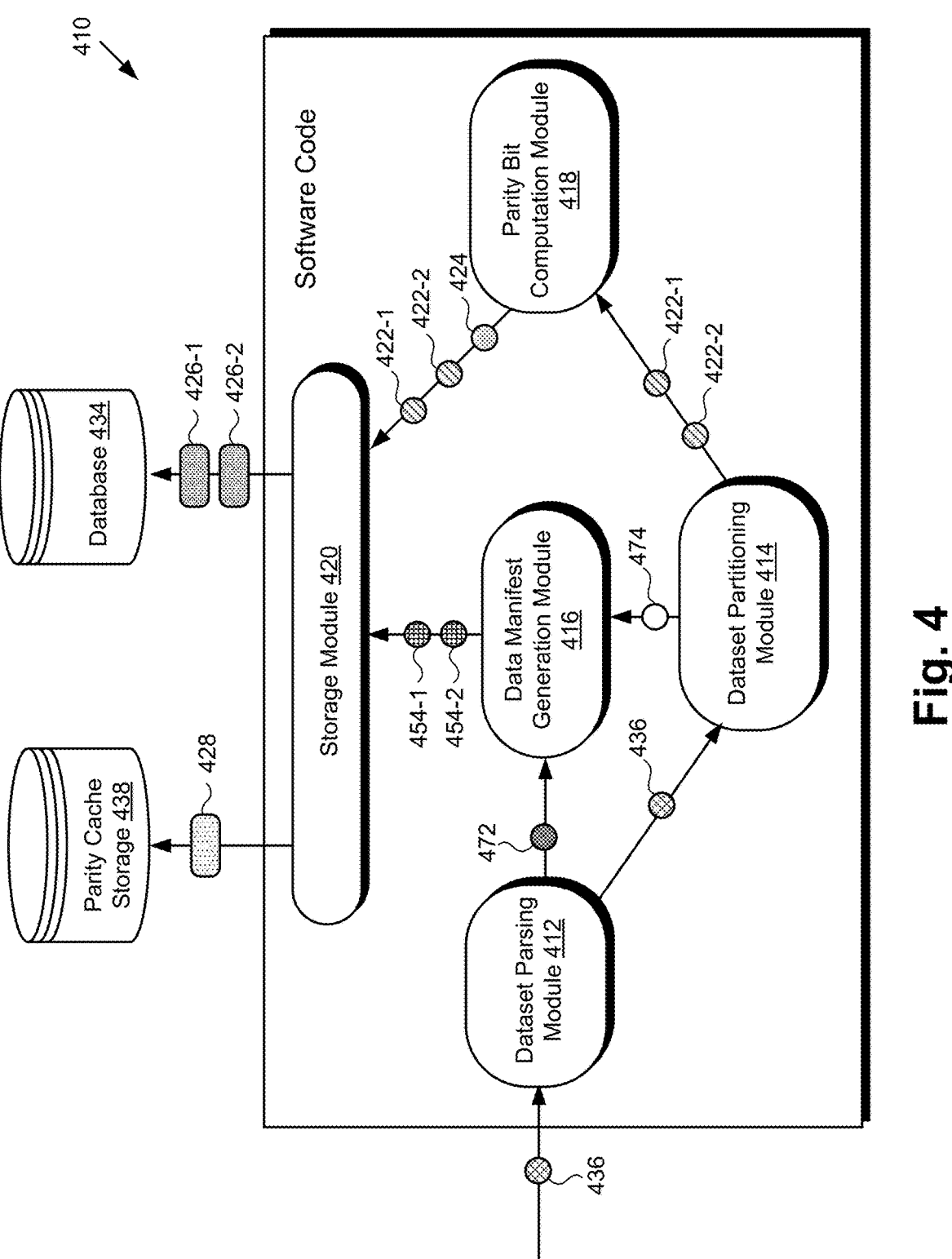
FIG. 4 shows a diagram of an exemplary software code suitable for use by a system for performing modular parity caching, according to one implementation.

The functionality of system 100 and software code 110 shown in FIG. 1 is further described below by reference to FIGS. 3 and 4. FIG. 3 shows flowchart 360 presenting an exemplary method for performing modular parity caching, according to one implementation, while FIG. 4 shows exemplary software code 410 suitable for use by system 100 for performing modular parity caching. With respect to the method outlined in FIG. 3, it is noted that certain details and features have been left out of flowchart 360 in order not to obscure the discussion of the inventive features in the present application.

Referring to FIG. 4, software code 410 may include dataset parsing module 412, dataset partitioning module 414, data manifest generation module 416, parity bit computation module 418 and storage module 420. In addition, FIG. 4 shows dataset 436, dataset description data 472, partitioning data 474, data subsets 422-1 and 422-2 partitioned out of dataset 436, parity cache 424 for dataset 436, data manifests 454-1 and 454-2 corresponding respectively to data subsets 422-1 and 422-2, first storage media 426-1 and 426-2, second storage medium 428, database 434 and parity cache storage 438.

Dataset 436, database 434 and parity cache storage 438 correspond respectively in general to dataset 136, database 134 and parity cache storage 138, in FIG. 1. Consequently, dataset 436, database 434 and parity cache storage 438 may share any of the characteristics attributed to respective dataset 136, database 134 and parity cache storage 138 by the present disclosure, and vice versa. Moreover, first storage media 426-1 and 426-2, and second storage medium 428 correspond respectively in general to first storage media 126-1/226-1, 126-2/226-2 and 226-*n*, and second storage medium 128/228, in FIGS. 1 and 2. As a result, first storage media 426-1 and 426-2, and second storage medium 428 may share any of the characteristics attributed to respective first storage media 126-1/226-1, 126-2/226-2 and 226-*n*, and second storage medium 128/228 by the present disclosure, and vice versa.

In addition, software code 410, in FIG. 4, corresponds in general to software code 110, in FIG. 1. Accordingly, software code 110 may share any of the characteristics attributed to software code 410 by the present disclosure, and vice versa. For example, although not shown in FIG. 1, like software code 410, software code 110 may include features corresponding respectively to dataset parsing module 412, dataset partitioning module 414, data manifest generation module 416, parity bit computation module 418 and storage module 420.

Referring to FIG. 3 in combination with FIGS. 1 and 4, the method outlined by flowchart 360 includes receiving dataset 136/436 (action 361). As noted above, dataset 136/436 may be a large dataset including terabytes of digital data. Dataset 136/436 may include media content in the form of video games, music videos, animation, movies, or episodic TV content that includes episodes of TV shows that are broadcasted, streamed, or otherwise available for download or purchase on the Internet or via a user application. In addition, or alternatively, as noted above in some implementations media content included in dataset 136/436 may be or include digital representations of persons, fictional characters, locations, objects, and identifiers such as brands and logos, which populate a VR, AR, or MR environment. Moreover, and as further noted above, in some implementations, such media content may depict virtual worlds that can be experienced by any number of users synchronously and persistently, while providing continuity of data such as personal identity, user history, entitlements, possessions, payments, and the like. As also noted above, media content included in dataset 136/436 may be or include content that is a hybrid of traditional audio-video and fully immersive VR/AR/MR experiences, such as interactive video.

In various implementations, dataset 136/436 may be received from data source 146, such as a producer or distributor of media content included in dataset 136/436, from data source 146 in the form of a data archive, or from user system 140 utilized by user 144, via communication network 130 and network communication links 132. Dataset 136/436 may be received, in action 361, by dataset parsing module 412 of software code 110/410, executed by hardware processor 104 of system 100.

Referring to FIG. 3 in combination with FIGS. 1, 2 and 4, the method outlined by flowchart 360 further includes identifying a first storage medium (hereinafter "first storage media 126-1/226-1/426-1, 126-2/226-2/426-2 and 226-*n*") for storing dataset 136/436 (action 362). First storage media 126-1/226-1/426-1, 126-2/226-2/426-2 and 226-*n* may be identified as being a linear storage medium, such as magnetic tape for example, or any other computer-readable non-transitory storage medium. In some implementations, first storage media 126-1/226-1/426-1, 126-2/226-2/426-2 and 226-*n* may be identified based on data or metadata included in dataset 136/436. Alternatively, in some implementations first storage media 126-1/226-1/426-1, 126-2/226-2/426-2 and 226-*n* may be identified based on inputs by user 144 received from user system 140. First storage media 126-1/226-1/426-1, 126-2/226-2/426-2 and 226-*n* for storing dataset 136/436 may be identified, in action 362, by software code 110/410, executed by hardware processor 104 of system 100, and using dataset parsing module 412 for example.

Continuing to refer to FIGS. 1, 2, 3 and 4 in combination, the method outlined by flowchart 360 further includes determining a target data size for a data subset (action 363). For example, dataset 136/436 may be stored across a plurality of instantiations of first storage media 126-1/226-1/426-1, 126-2/226-2/426-2 and 226-*n*, resulting in plurality of data subsets 222-1/422-1, 222-2/422-2 and 222-*n*. It is noted that where first storage media 126-1/226-1/426-1, 126-2/226-2/426-2 and 226-*n* are magnetic tapes, each instantiation of first storage media 126-1/226-1/426-1, 126-2/226-2/426-2 and 226-*n* may be a different tape. Alternatively, in implementations in which where first storage media 126-1/226-1/426-1, 126-2/226-2/426-2 and 226-*n* take the form of optical discs, FLASH memory, or hard drives, first storage media 126-1/226-1/426-1, 126-2/226-2/426-2 and 226-*n* be different optical discs, different FLASH drives, or different hard disks.

In some implementations, the target data size for data subsets 222-1/422-1, 222-2/422-2 and 222-*n* may be determined based on data or metadata included in dataset 136/436. For example, the target data size for data subsets 222-1/422-1, 222-2/422-2 and 222-*n* may be determined by the data storage capacity of the storage media on which data subsets 222-1/422-1, 222-2/422-2 and 222-*n* are to be stored. Alternatively, in some implementations the target data size for data subsets 222-1/422-1, 222-2/422-2 and 222-*n* may be determined based on inputs by user 144 received from user system 140. Moreover, in yet other implementations in which a variety of different storage media are used to store data subsets 222-1/422-1, 222-2/422-2 and 222-*n*, the target data size for data subsets 222-1/422-1, 222-2/422-2 and 222-*n* may be determined by the storage capacity of the storage medium having the smallest data storage capacity. In various implementations, the target data size for data subsets 222-1/422-1, 222-2/422-2 and 222-*n* may be determined, in action 363, by software code 110/410, executed by hardware processor 104 of system 100, and using dataset parsing module 412 or dataset partitioning module 414.

It is noted that although flowchart 360 describes action 363 as following action 362, that representation is provided merely as an example. In various implementations, action 363 may follow action 362, may precede action 362, or may be performed in parallel with, i.e., contemporaneously with, action 362.

Continuing to refer to FIGS. 1, 2, 3 and 4 in combination, the method outlined by flowchart 360 further includes partitioning dataset 136/436 into plurality of data subsets 222-1/422-1, 222-2/422-2 and 222-*n* each having the target data size (action 364). As noted above by reference to FIG. 2, parity cache 224 for data subsets 222-1, 222-2, . . . , 222-*n* includes parity bit 252 for each data field occupying the same position in each of respective data subsets 222-1, 222-2, . . . , 222-*n*. Accordingly, and referring to FIGS. 1, 2 and 4 in combination, in some implementations, how many data subsets are included in plurality of data subsets 222-1, 222-2, . . . , 222-*n* into which dataset 136/436 is partitioned may be determined by the storage capacity of second storage medium 228 used to store parity cache 224.

The partitioning of dataset 136/436 into plurality of data subsets 222-1/422-1, 222-2/422-2 and 222-*n* each having the target data size, may be performed, in action 364, by dataset partitioning module 414 of software code 110/410, executed by hardware processor 104 of system 100. For example, dataset 136/436 may be partitioned, in action 364, by being divided into data subsets 222-1/422-1, 222-2/422-2 and 222-*n* under the dual constraints that that no data subset includes more than the target data size and no data subset includes a partial data file. That is to say, dataset partitioning module 414 may be trained or otherwise configured to optimize the distribution of data files included in dataset 136/146 among data subsets 222-1/422-1, 222-2/422-2 and 222-*n* such that data files are not split between different data subsets. Moreover, where any of data subsets 222-1/422-1, 222-2/422-2 and 222-*n* receive less than the target data size of data from dataset 136/436 due to avoidance of file splitting, dataset partitioning module 414 may be further trained or configured to generate filler data to ensure that each of data subsets 222-1/422-1, 222-2/422-2 and 222-*n* contains the target data size.

It is noted that although flowchart 360 describes action 364 as following action 362, that representation is provided merely as an example. In various implementations, action 364, like action 363, may follow action 362, may precede action 362, or may be performed in parallel with, i.e., contemporaneously with, action 362.

Continuing to refer to FIGS. 1, 2, 3 and 4 in combination, the method outlined by flowchart 360 further includes computing, using plurality of data subsets 222-1/422-1, 222-2/422-2 and 222-*n*, parity bit 252 for each data field occupying the same position in each of respective plurality of data subsets 222-1/422-1, 222-2/422-2 and 222-*n* to provide a plurality of parity bits each corresponding respectively to one data field occupying the same position in each of respective plurality of data subsets 222-1/422-1, 222-2/422-2 and 222-*n* (action 365). As shown in FIG. 2, exemplary parity bit 252 for data field 251 occupying the same position in each of respective plurality of data subsets 222-1, 222-2, . . . , 222-*n* may be computed by combining the values occupying data field 251 in each of data subsets 222-1, 222-2, . . . , 222-*n*, i.e., values P1, P2, . . . , Pn, such as by applying a Boolean XOR function to P1, P2, . . . , Pn for example, as described above by reference to FIG. 2. That process described by reference to FIG. 2 for data field 251 may be repeated for each data field occupying the same position in each of respective data subsets 222-1, 222-2, . . . , 222-*n*.

The computation of parity bit 252 for each data field occupying the same position in each of respective plurality of data subsets 222-1/422-1, 222-2/422-2 and 222-*n* to provide a plurality of parity bits each corresponding respectively to one data field occupying the same position in each of respective plurality of data subsets 222-1/422-1, 222-2/422-2 and 222-*n*, in action 365, may be performed by parity bit computation module 418 of software code 110/410, executed by hardware processor 104 of system 100. It is noted that although flowchart 360 describes action 365 as following action 362, that representation is provided merely as an example. In various implementations, action 365, like actions 363 and 364, may follow action 362, may precede action 362, or may be performed in parallel with, i.e., contemporaneously with, action 362.

Continuing to refer to FIGS. 1, 2, 3 and 4 in combination, in some implementations, flowchart 360 may further include generating, for each one of plurality of data subsets 222-1/422-1, 222-2/422-2 and 222-*n*, a data manifest describing data included in the one of plurality of data subsets 222-1/422-1, 222-2/422-2 and 222-*n* to provide plurality of data manifests 254-1/454-1, 254-2/454-2 and 254-*n* corresponding respectively to plurality of data subsets 222-1/422-1, 222-2/422-2 and 222-*n* (action 366). The method for generating the data manifest may be written into each data subset and may also be used in the parity data. It may also be exported as a sidecar data manifest file, such as an XML file of the like, which could be stored in a database. It is noted that the data manifest may be used to create and recall the order of the data having gone through the partitioning process described above, and may also be used to create filler data as needed.

It is further noted that action 366 is optional, and in some implementations may be omitted from the method outlined by flowchart 360. In implementations in which the method outlined by flowchart 360 includes optional action 366, plurality of data manifests 254-1/454-1, 254-2/454-2 and 254-*n* corresponding respectively to plurality of data subsets 222-1/422-1, 222-2/422-2 and 222-*n* may be generated using dataset description data 472 parsed from dataset 136/436 using dataset parsing module 412 and partitioning data 474 output by dataset partitioning module 414 of software code 110/410.

In implementations in which the method outlined by flowchart 360 includes optional action 366, action 366 may be performed by data manifest generation module 416 of software code 110/410, executed by hardware processor 104 of system 100. It is further noted that although flowchart 360 describes optional action 366 as following actions 362, 363, 364 and 365 (hereinafter "actions 362-365"), that representation is provided merely as an example. In various implementations, action 366 may follow any or all of actions 362-365, may precede any or all of actions 362-365, or may be performed in parallel with, i.e., contemporaneously with, any or all of actions 362-365.

Continuing to refer to FIGS. 1, 2, 3 and 4 in combination, the method outlined by flowchart 360 further includes storing, i.e., writing, each of plurality of data subsets 222-1/422-1, 222-2/422-2 and 222-$n$ in first storage media 126-1/226-1/426-1, 126-2/226-2/426-2 and 226-$n$ (action 367). As noted above, first storage media 126-1/226-1/426-1, 126-2/226-2/426-2 and 226-$n$ may each take the form of a linear storage medium, such as magnetic tape for example, or any other type of computer-readable non-transitory storage medium. It is contemplated that each of plurality of data subsets 222-1/422-1, 222-2/422-2 and 222-$n$ are stored in a different respective instantiation of first storage media 126-1/226-1/426-1, 126-2/226-2/426-2 and 226-$n$, each being of the same storage media type. For example, where first storage media 126-1/226-1/426-1, 126-2/226-2/426-2 and 226-$n$ take the form of magnetic tapes, data subset 222-1/422-1 is stored in a first magnetic tape, data subset 222-2/422-2 is stored in a second magnetic tape, and so forth, until data subset 222-$n$ is stored in an $n^{th}$ magnetic tape.

In implementations in which the method outlined by flowchart 360 includes optional action 366, action 367 may further include storing each of plurality of data manifests 254-1/454-1, 254-2/454-2 and 254-$n$ corresponding respectively to plurality of data subsets 222-1/422-1, 222-2/422-2 and 222-$n$ with plurality of data subsets 222-1/422-1, 222-2/422-2 and 222-$n$ in first storage media 126-1/226-1/426-1, 126-2/226-2/426-2 and 226-$n$. Thus, first storage media 126-1/226-1/426-1 may store data subset 222-1/422-1 and data manifest 254-1/454-1, first storage media 126-2/226-2/426-2 may store data subset 222-2/422-2 and data manifest 254-2/454-2, and so forth, until first storage media 226-$n$ stores data subset 222-$n$ and data manifest 254-$n$.

Storage of each of plurality of data subsets 222-1/422-1, 222-2/422-2 and 222-$n$ in first storage media 126-1/226-1/426-1, 126-2/226-2/426-2 and 226-$n$, and optional storage of each of plurality of data manifests 254-1/454-1, 254-2/454-2 and 254-$n$ in first storage media 126-1/226-1/426-1, 126-2/226-2/426-2 and 226-$n$, in action 367, may be performed by storage module 420 of software code 110/410, executed by hardware processor 104 of system 100, through execution of a write operation. Once data subsets 222-1/422-1, 222-2/422-2 and 222-$n$ and optionally data manifests 254-1/454-1, 254-2/454-2 and 254-$n$ are stored in first storage media 126-1/226-1/426-1, 126-2/226-2/426-2 and 226-$n$, hardware processor 104 of system 100 may execute software code 110/410 to output first storage media 126-1/226-1/426-1, 126-2/226-2/426-2 and 226-$n$ to database 134/434.

It is noted that although flowchart 360 describes action 367 as following actions 363, 364, 365 and optional action 366, that representation is provided merely as an example. Although action 367 does follow actions 362, 363, 364 and optional action 366 when performed, in various implementations action 367 may follow action 365, may precede action 365, or may be performed in parallel with, i.e., contemporaneously with, action 365.

Continuing to refer to FIGS. 1, 2, 3 and 4 in combination, the method outlined by flowchart 360 further includes storing each of the plurality of parity bits provided in action 365 as parity cache 224/424 in second storage medium 128/228/428 (action 368). As noted above, second storage medium 128/228/428 may each take the form of a linear storage medium, such as magnetic tape for example, or any other type of computer-readable non-transitory storage medium. It is contemplated that parity cache 224/424 is stored in its entirety in a single instantiation of second storage medium 128/228/428, which may be the same type of storage medium as first storage media 126-1/226-1/426-1, 126-2/226-2/426-2 and 226-$n$, or a different type of storage media. For example, where first storage media 126-1/226-1/426-1, 126-2/226-2/426-2 and 226-$n$ take the form of magnetic tapes, parity cache 224/424 may be stored in second storage medium 128/228/428 in the form of another magnetic tape or any other type of computer-readable non-transitory storage medium. It is noted that in implementations in which the method outlined by flowchart 360 includes optional action 366, action 368 may further include storing each of plurality of data manifests 254-1/454-1, 254-2/454-2 and 254-$n$ as global manifest 256 with parity cache 224/424 in second storage medium 128/228/428.

Storage of parity cache 224/424 in second storage medium 128/228/428, and optional storage of each of global manifest 256 in second storage medium 128/228/428, in action 368, may be performed by storage module 420 of software code 110/410, executed by hardware processor 104 of system 100. Once parity cache 224/424 and optionally global manifest 256 are stored in second storage medium 128/228/428, hardware processor 104 of system 100 may execute software code 110/410 to output second storage medium 128/228/428 to parity cache storage 138/438.

It is noted that although flowchart 360 describes action 368 as following actions 367, that representation is provided merely as an example. Although action 368 does follow actions 363, 364, 365 and optional action 366 when performed, in various implementations action 368 may follow one or both of actions 362 and 365, may precede one or both of actions 362 and 365, or may be performed in parallel with, i.e., contemporaneously with, one or both of actions 362 and 365. Moreover, with respect to the method outlined by flowchart 360 and described above, it is noted that actions 361, 362, 363, 364 and 365 (hereinafter "actions 361-365") as well as actions 367 and 368, or actions 361-365, optional action 366, and actions 367 and 368, may be performed in an automated process from which human participation may be omitted.

Thus, the present application discloses systems and methods for performing modular parity caching that overcomes the drawbacks and deficiencies in the conventional art. The solution disclosed herein includes partitioning a dataset into a plurality of data subsets, where each data subset represents a specific amount of data that will be written to a single magnetic tape or to a single instantiation of another storage medium. The present modular parity caching solution advances the state-of-the-art by introducing a virtual data stripe that can be created across all data subsets and enables the computation of a parity bit that can be stored in a parity cache. Once the parity data has been computed for all the data subsets, the parity cache can be written to magnetic tape or another storage medium separate from the storage media to which the data subsets are written.

In addition to the parity cache, which represents the parity information across the virtual data stripe, a dataset manifest may also be generated for each data subset. The data manifest includes detailed information about the files and data that make up a given data subset. The data manifests can be stored along with the parity cache data and can be used to quickly identify all the files needed to rebuild the parity cache. Having a data manifest also provides for a simple method of restoring individual files or partial data subsets. In the event a data subset is damaged or overwritten, the missing data subset can be recovered using the remaining undamaged data subsets and the parity data.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:

a computing platform including a hardware processor and a system memory storing a software code;

the hardware processor configured to execute the software code to:

receive a dataset;

identify a first storage medium for storing the dataset;

determine a target data size for a data subset;

partition the dataset into a plurality of data subsets such that (i) each of the plurality of data subsets has the target data size, and (ii) no data file included in the dataset is split between different data subsets of the plurality of data subsets;

compute, using the plurality of data subsets, a parity bit for each data field occupying a same position in each of the plurality of data subsets to provide a plurality of parity bits each corresponding respectively to one data field occupying the same position in each of the plurality of data subsets;

store each of the plurality of data subsets in the first storage medium; and store the plurality of parity bits as a parity cache in a second storage medium.

2. The system of claim 1, wherein the hardware processor is further configured to execute the software code to:

generate, for each one of the plurality of data subsets, a data manifest describing data included in the one of the plurality of data subsets to provide a plurality of data manifests corresponding respectively to the plurality of data subsets; and store the plurality of data manifests with the parity cache in the second storage medium.

3. The system of claim 1, wherein the target size for the data subset is determined based on a storage capacity of the first storage medium.

4. The system of claim 1, wherein how many data subsets are included in the plurality of data subsets is determined based on a storage capacity of the second storage medium.

5. The system of claim 1, wherein the first storage medium comprises a plurality of storage media of a first type, and wherein the second storage medium is a single storage medium of the first type or a second type.

6. The system of claim 1, wherein the first storage medium and the second storage medium are a same storage medium.

7. The system of claim 1, wherein the first storage medium is a linear storage medium.

8. The system of claim 1, wherein the first storage medium is a magnetic tape.

9. The system of claim 1, wherein the first storage medium is a magnetic tape, and wherein the second storage medium is any other computer-readable non-transitory storage medium.

10. The system of claim 1, wherein the first storage medium is any computer-readable non-transitory storage medium, and wherein the second storage medium is a same type or another type of computer-readable non-transitory storage medium.

11. A method for use by a system including a computing platform having a hardware processor and a system memory storing a software code, the method comprising:

receiving, by the software code executed by the hardware processor, a dataset;

identifying, by the software code executed by the hardware processor, a first storage medium for storing the dataset;

determining, by the software code executed by the hardware processor, a target data size for a data subset;

partitioning the dataset, by the software code executed by the hardware processor, into a plurality of data subsets such that (i) each of the plurality of data subsets has the target data size, and (ii) no data file included in the dataset is split between different data subsets of the plurality of data subsets;

computing, by the software code executed by the hardware processor and using the plurality of data subsets, a parity bit for each data field occupying a same position in each of the plurality of data subsets to provide a plurality of parity bits each corresponding respectively to one data field occupying the same position in each of the plurality of data subsets;

storing, by the software code executed by the hardware processor, each of the plurality of data subsets in the first storage medium; and storing, by the software code executed by the hardware processor, the plurality of parity bits as a parity cache in a second storage medium.

12. The method of claim 11, further comprising:

generating, by the software code executed by the hardware processor, for each one of the plurality of data subsets, a data manifest describing data included in the one of the plurality of data subsets to provide a plurality of data manifests corresponding respectively to the plurality of data subsets; and storing, by the software code executed by the hardware processor, the plurality of data manifests with the parity cache in the second storage medium.

13. The method of claim 11, wherein the target size for the data subset is determined based on a storage capacity of the first storage medium.

14. The method of claim 11, wherein how many data subsets are included in the plurality of data subsets is determined based on a storage capacity of the second storage medium.

15. The method of claim 11, wherein the first storage medium comprises a plurality of storage media of a first type, and wherein the second storage medium is a single storage medium of the first type or a second type.

16. The method of claim 11, wherein the first storage medium and the second storage medium are a same storage medium.

17. The method of claim 11, wherein the first storage medium is a linear storage medium.

18. The method of claim 11, wherein the first storage medium is a magnetic tape.

19. The method of claim 11, wherein the first storage medium is a magnetic tape, and wherein the second storage medium is any other computer-readable non-transitory storage medium.

20. The method of claim 11, wherein the first storage medium is any computer-readable non-transitory storage medium, and wherein the second storage medium is a same type or another type of computer-readable non-transitory storage medium.

* * * * *